United States Patent [19]

Finley

[11] 4,311,012
[45] Jan. 19, 1982

[54] METHOD AND APPARATUS FOR TRANSFERRING COLD SEAWATER UPWARD FROM THE LOWER DEPTHS OF THE OCEAN TO IMPROVE THE EFFICIENCY OF OCEAN THERMAL ENERGY CONVERSION SYSTEMS

[76] Inventor: Warren T. Finley, 10352 Miralago Pl., Santa Ana, Calif. 92705

[21] Appl. No.: 122,301

[22] Filed: Feb. 19, 1980

Related U.S. Application Data

[63] Continuation-in-part of Ser. No. 931,675, Aug. 7, 1978, Pat. No. 4,189,379, which is a continuation-in-part of Ser. No. 833,939, Sep. 16, 1977, abandoned.

[51] Int. Cl.³ ............................................. F03G 7/04
[52] U.S. Cl. .................................................. 60/641.7
[58] Field of Search ............ 165/45; 60/641 B, 641.7; 210/644; 203/DIG. 20

[56] References Cited

U.S. PATENT DOCUMENTS 4,104,883  8/1978  Naet ................................... 60/641.7
4,189,379  2/1980  Finley ................................. 210/644
4,245,475  1/1981  Girden ............................... 60/641.7

Primary Examiner—Allen M. Ostrager
Assistant Examiner—Stephen F. Husar
Attorney, Agent, or Firm—Knobbe, Martens

[57] ABSTRACT

A method and apparatus for transferring cold seawater from lower ocean depths upward toward sea level for use in ocean thermal energy conversion systems is disclosed wherein an in situ desalination process is utilized to create a density differential between the desalinated water and the surrounding seawater. The desalinated water being of a lesser density than the surrounding seawater, rises naturally upward through a conduit and is utilized as a heat transfer medium in the ocean thermal energy conversion system. The desalinated water, which is a byproduct of the energy conversion system, may be utilized for domestic consumption or alternatively dispersed into the near surface region (photic zone) of the ocean to increase the nutrient concentration therein.

10 Claims, 2 Drawing Figures

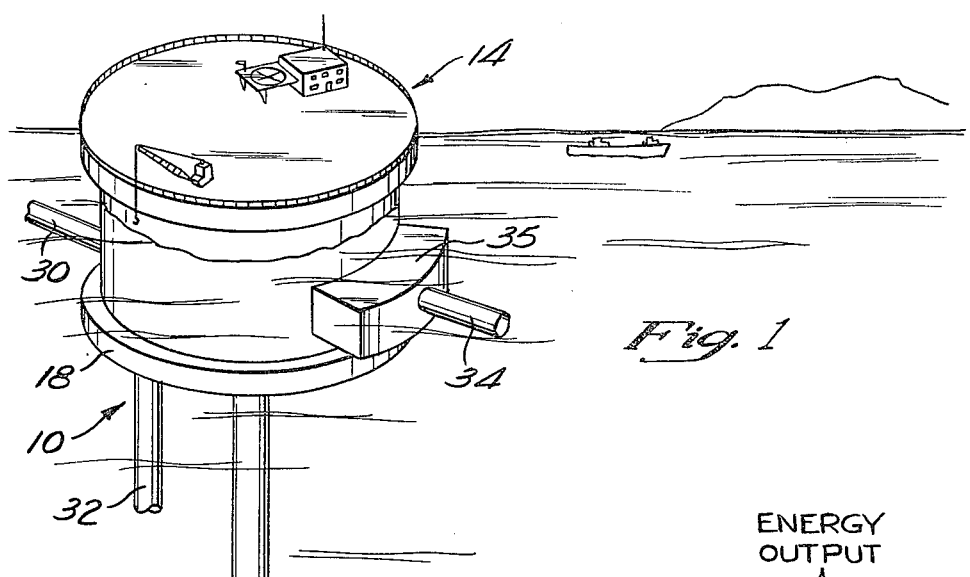
Fig. 1
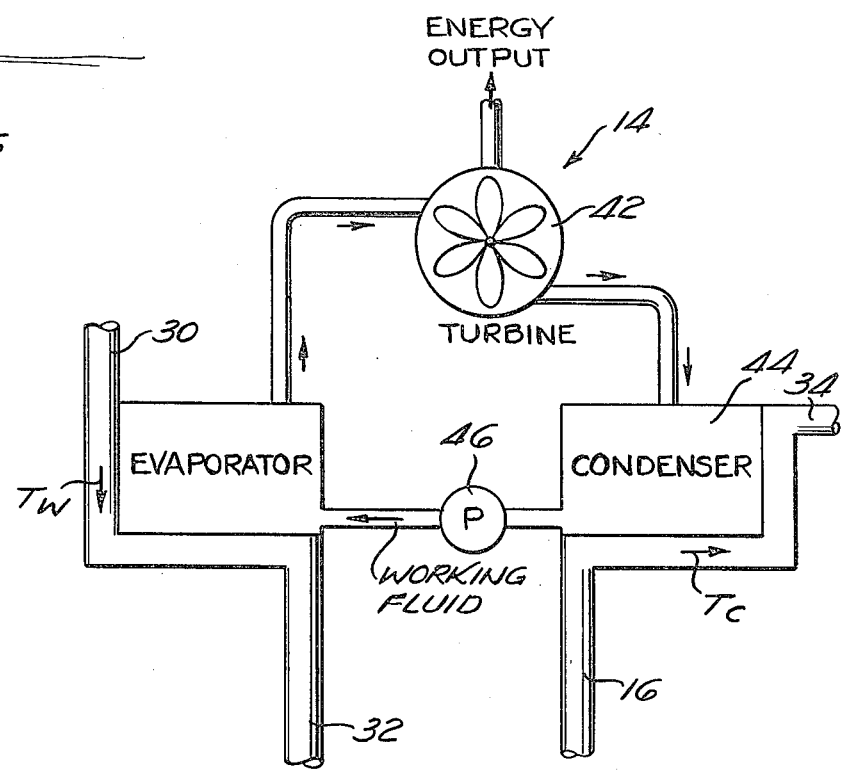
Fig. 2
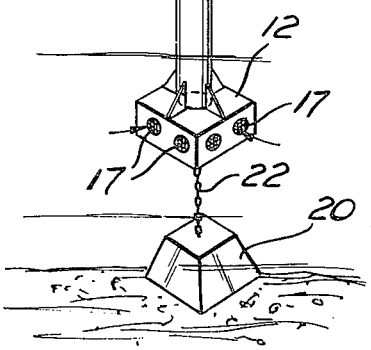

METHOD AND APPARATUS FOR TRANSFERRING COLD SEAWATER UPWARD FROM THE LOWER DEPTHS OF THE OCEAN TO IMPROVE THE EFFICIENCY OF OCEAN THERMAL ENERGY CONVERSION SYSTEMS

RELATED APPLICATIONS

This is a continuation-in-part of my co-pending patent application, Ser. No. 931,675, filed Aug. 7, 1978, now U.S. Pat. No. 4,189,379, which is a continuation-in-part of my patent application Ser. No. 833,939, filed Sept. 16, 1977, now abandoned.

BACKGROUND OF THE INVENTION

The present invention relates generally to ocean thermal energy conversion power systems, and more particularly, to a method and apparatus for transferring cold water maintained adjacent the lower depths of the ocean upward toward the upper region of the ocean to increase the efficiency of ocean thermal energy conversion systems.

With the world energy demand continuing to increase at an exponential rate, and known petroleum reserves being rapidly depleninshed, attention has been directed to the utilization and development of alternative non-conventional energy sources. Much of this attention has been directed toward ocean bodies which, due to their immense size (covering nearly three-quarters of the earth's surface) and their ability to naturally store substantial quantities of solar radiation, represent a vast energy source potential. Although tidal water conversion systems have recently been utilized in some ocean bodies, to date the most promising means for extracting energy from the ocean appears to be ocean thermal energy conversion systems.

Basically, such ocean thermal energy conversion systems utilize a heat cycle or Carnot engine which operates on the temperature differential or thermal gradient existing between the ocean's surface and its lower depths, which typically is a magnitude of approximately 20 degrees Celsius. Due to this temperature gradient, a suitable working fluid, such as ammonia, Freon, and/or water, may be selectively vaporized by the warm upper region seawater and expanded through a turbine to yield a direct mechanical power output or alternatively, coupled to a generator to produce an electrical power output. Subsequent to the expansion of the vaporized working fluid through the turbine, cold water from the lower depths of the ocean may be utilized to condense the working fluid vapor, with the evaporation, turbine expansion, and condensing processes being repeated on a continuous basis. As is well known, the maximum efficiency of such heat cycle engines or Carnot engine systems is a function of the absolute temperature gradient existing between the evaporator and condenser of the engine. With specific reference to ocean thermal energy conversion systems, the maximum thermal efficiency is equal to $$1 - \frac{\text{Temperature cold water}}{\text{Temperature warm water}}$$

which, typically, is approximately 7 to 9 percent.

Due to the maximum thermal efficiency of the ocean thermal energy conversion plants being limited to this low percentage, to produce a net power gain during operation, the auxilary systems, such as the turbine, electrical generator, and pumping systems, must be designed to operate at extremely high efficiencies. Although the state-of-the-art turbine and electrical generator design has, to a great extent, reached such high efficiencies, the necessity of pumping large quantities of cold water from ocean depths approximating 2,000 to 3,000 feet has placed a severe energy drain on the ocean thermal power plants. This pumping inefficiency has been the major limitation on ocean thermal energy conversion systems and, in many cases, has reduced the overall system efficiency to as low as 1 or 2 percent. As such, there exists substantial need for a high efficiency apparatus and method for transporting cold water from the lower ocean depths upward toward the ocean thermal power plant.

SUMMARY OF THE PRESENT INVENTION

The present invention specifically addresses the cold water pumping deficiencies of the prior art and utilizes a radically different principle for transferring deep ocean water upward toward the ocean thermal energy plant. The present invention is based upon the principle that seawater, with its substantial quantity of solutes, is significantly denser than fresh water. Therefore, if a portion of the solutes are removed from the deep cold water regions of the ocean water, it becomes less dense than the surrounding water, and rises naturally upward toward the upper regions of the ocean.

The preset invention incorporates this principle by utilizing a submerged seawater desalination device located adjacent the lower depths of the ocean, which partially or completely desalinates the cold ocean water entering therein. The desalinated water so produced being less dense than the surrounding seawater, rises naturally upward through a conduit leading to the ocean thermal energy conversion plant wherein it is utilized to condense the working fluid of the heat cycle engine/power generating system. By such a cold water transporting process, the extremely high pumping costs heretofore associated in ocean thermal energy conversion plants is substantially reduced with the attendent increase in the overall operating efficiency of the thermal energy conversion plant.

BRIEF DESCRIPTION OF THE DRAWINGS

These, as well as other features of the present invention, will become more apparent upon reference to the drawings wherein:

FIG. 1 is a perspective view of the present invention showing the undersea implacement of the desalination unit and its interconnection with the ocean thermal energy power plant; and FIG. 2 is a schematic illustration of the internal operation of the ocean thermal energy power plant and the manner in which the warm and cold ocean water is utilized to evaporate and condense, respectively, the working fluid within the heat cycle engine system.

DETAILED DESCRIPTION OF THE PREFERRED EMBODIMENT

Referring to FIG. 1, there is shown the apparatus 10 of the present invention composed generally of a seawater desalination unit 12, submerged adjacent the lower depths of the ocean (i.e., preferably below the ocean thermocline at depths of 1,000 meters or greater where the temperature of the seawater approaches freezing), and an ocean thermal energy conversion power plant 14 maintained adjacent sea level. The construction and operation of the desalination unit 12 is thoroughly disclosed in my above-referenced patent application Ser. No. 931,675, now U.S. Pat. No. 4,189,379, the disclosure of which is expressly incorporated herein by reference. The desalinating unit 12 is connected to the power plant 14 by way of a central conduit 16 and the entire apparatus 10 may be maintained at a desired location within the ocean by way of one or more ballast tanks 18 formed on the lower portion of the power plant 14 and a suitable anchor 20 and securing means 22. Those skilled in the art will recognize that various other means may be devised to maintain the apparatus 10 at the desired location while permitting the same to moderately buoy in response to varying ocean conditions.

The power plant 14 is provided with a warm water inlet conduit 30 and output conduit 32 which direct the relatively warm seawater adjacent sea level through the interior of the power plant 14, while the conduit 16 and conduit 34 similarly provide the cold water inlet and outlet, respectively, for the power plant 14.

Referring to FIG. 2, the power plant 14 basically comprises a heat cycle engine including an evaporator 40, turbine 42, and condensor 44 which may be connected in either an opened or closed loop power system. A suitable working fluid, such as ammonia, Freon, or water, is circulated through the heat engine as by a pump 46, in the direction of the arrows indicated in FIG. 2. The evaporator 40 is located to be in thermal communication with the warm water $T_w$ traveling through the warm water inlet and outlet 30 and 32 such that heat transfer from the warm water $T_w$ to the working fluid causes the working fluid to vaporize. The fluid vapor is directed and expanded through the turbine 42 which generates an energy output in a well-known manner. The fluid vapor is subsequently transported into the condensor 44 which is located to be in thermal communication with the cold water $T_c$ traveling through the cold water inlet and outlet 16 and 34, respectively, wherein heat transfer from the cold water $T_c$ into the working fluid reliquifies or condenses the working fluid. This evaporation, expansion, and condensing process is repeated such that a continuous power output is generated at the turbine 42. A more detailed description of the structure and operation of such a heat cycle engine of the power plant 14 is disclosed in an article by Robert Cohen entitled ENERGY FROM OCEAN THERMAL GRADIENTS, pages 12-22 of *Oceanus*, Volume 22, No. 4, Winter 1979/80, the disclosure of which is expressly incorporated herein by reference.

In operation of the apparatus 10, cold seawater from below the ocean thermocline flows into the desalination unit 12 through plural intakes 17 wherein it is completely or partially desalinated. The desalinated seawater so produced is directed into the interior of the cold water intake conduit 16 wherein due to its reduced density as compared to the surrounding seawater, the desalinated seawater rises upward through the conduit 16 and into the power plant 14; subsequently exiting through the outlet 34. Simultaneously, relatively warm seawater adjacent the sea level is circulated through the warm water inlet and outlet conduits 30 and 32 and through the power plant 14. As such, the evaporator 40 and condensor 44 of the power plant 14 are in thermal communication with the temperature gradient existing between the upper and lower depths of the ocean whereby the working fluid of the heat cycle engine maintained within the power plant 14 may be continuously circulated to produce an energy output.

Those skilled in the art will recognize that the desalination method and apparatus of the present invention provides a viable alternative to the cold seawater pumping systems, heretofore utilized in the art which is capable of substantially reducing pumping cost and thus dramatically increasing the overall efficiency of the ocean thermal energy conversion plants. Further, due to the desalination unit 12 preferably reducing the salt content of the cold seawater to a value sufficient for human consumption, the cold water outlet conduit 34 may be provided with suitable filtration and pumping means 35 to yield drinking water as a system byproduct. Similarly, by using a suitable desalination process, such as electro-dialysis, which removes the salt content while leaving the seawater nutrient rich, the desalinated cold water may be dispersed through the conduit 34 back into the upper portion of the ocean. Such dispersion is beneficial to the ocean ecology by applying increased nutrients to the photic zone of the ocean which increase fishery production and fish harvesting.

In addition, it will be recognized that to facilitate the upper region water temperature being maintained at a maximum value during continued operation of the apparatus, it is beneficial to locate the apparatus in a strong current area of the ocean, whereby the cold lower depth desalinated water exiting through the cold water outlet 34 is transported away from the warm water inlet 30.

What is claimed is:

1. In an ocean thermal energy conversion plant having a heat cycle engine system which operates on the temperature differential between the upper and lower depths of the ocean, a method of efficiently transporting the lower depth seawater upward to said heat cycle engine system, comprising:
   submerging conduit means into said ocean to extend from said lower depth upward to said heat cycle engine system; and
   at least partially desalinating the seawater at said lower depth to reduce the density of said seawater, so that said desalinated seawater naturally rises upward within said conduit means to said heat cycle engine system.

2. The method of claim 1 wherein said desalinating step leaves a high concentration of nutrients in said desalinated seawater.

3. The method of claim 1 wherein said conduit means is submerged into said ocean to extend from below the thermocline of the ocean upward to said heat cycle engine system.

4. The method of claim 1 wherein said conduit means is submerged to extend from approximately 1,000 meters below sea level to said heat cycle system.

5. A method of transporting cold seawater from lower depths of the ocean upward toward sea level for use as a heat transfer medium in an energy conversion system which includes heat exchange means, comprising:
   submerging water desalinating means into the lower depths of the ocean;
   introducing cold seawater from said lower depths into said desalinating means;
   at least partially desalinating said introduced cold seawater to reduce its density so that said desalinated cold seawater is transported upward to said using system by the density differential between said cold desalinated seawater and said seawater; and directing said cold desalinated seawater into thermal communication with said heat exchange means to transfer heat from said heat exchange means to said cold desalinated seawater.

6. The method of claim 5 wherein said desalinating step leaves a high concentration of nutrients in said desalinated seawater and after said directing step, said method comprises the further step of:

dispersing said desalinated cold seawater into the photic zone of said ocean to increase the concentration of nutrients in said photic zone.

7. In an ocean thermal energy conversion plant, including means for generating energy by use of the temperature gradient existing between the upper and lower depth seawater, an apparatus for efficiently transporting said lower depth seawater upward toward said generating means, comprising:

means submerged in said lower depth seawater for at least partially desalinating said lower depth seawater to reduce its density; and a conduit for directing said desalinated seawater from said desalinating means upward to said generating means, said desalinated seawater rising naturally upward within said conduit in response to the density differential developed between said desalinated seawater and said seawater.

8. The apparatus of claim 7 further comprising means for directing said desalinated seawater against a heat exchanger of said generating means to transfer heat from said heat exchanger to said desalinated seawater.

9. The apparatus of claim 8 wherein said desalinating means include means for maintaining a high concentration of nutrients in said desalinated seawater.

10. The apparatus of claim 9 further comprising means for dispersing said desalinated seawater back into the upper depth of said seawater to increase the nutrient concentration of the photic zone of said ocean.

* * * * *